United States Patent [19]

Asano et al.

[11] Patent Number: 4,729,671
[45] Date of Patent: Mar. 8, 1988

[54] TEMPERATURE CONTROL INDICATOR UNIT

[75] Inventors: Makoto Asano, Yokohama; Iwao Chiba; Masumi Iemura, both of Shibata, all of Japan

[73] Assignee: Mitsui Toatsu Chemicals, Inc., Tokyo, Japan

[21] Appl. No.: 948,156

[22] Filed: Dec. 31, 1986

Related U.S. Application Data

[63] Continuation of Ser. No. 732,823, filed as PCT JP84/00148, Mar. 29, 1984, published as WO85/01105, Mar. 14, 1985, abandoned.

[30] Foreign Application Priority Data

Sep. 5, 1983 [JP] Japan .................. 58-161889

[51] Int. Cl.$^4$ ............................. G01K 11/06
[52] U.S. Cl. ................. 374/160; 374/106; 116/219
[58] Field of Search .......... 374/160, 161, 162, 106; 116/207, 219

[56] References Cited

U.S. PATENT DOCUMENTS

| | | | |
|---|---|---|---|
| 3,002,385 | 10/1961 | Wahl et al. | 374/106 |
| 3,695,903 | 10/1972 | Telkes et al. | 374/106 |
| 3,774,450 | 11/1973 | Goodsey | 374/106 |
| 3,826,141 | 7/1974 | Pickett et al. | 374/160 |
| 4,057,029 | 11/1977 | Seiter | 374/106 |
| 4,114,926 | 9/1978 | Habib et al. | 282/27.5 |
| 4,301,054 | 11/1981 | Buirley et al. | 374/162 |
| 4,339,207 | 7/1982 | Hof et al. | 374/160 |
| 4,398,753 | 8/1983 | Asano et al. | 282/27.5 |
| 4,469,452 | 9/1984 | Sharpless et al. | 374/106 |
| 4,620,941 | 11/1986 | Yoshikawa et al. | 374/162 |
| 4,637,896 | 1/1987 | Shannon | 374/162 |
| 4,643,588 | 2/1987 | Postle et al. | 374/160 |

FOREIGN PATENT DOCUMENTS

| | | | |
|---|---|---|---|
| 0124032 | 9/1980 | Japan | 374/106 |
| 58-2282 | 12/1983 | Japan | |
| 59-76088 | 10/1984 | Japan | |

Primary Examiner—Charles Frankfort
Assistant Examiner—Thomas B. Will
Attorney, Agent, or Firm—Fisher, Christen & Sabol

[57] ABSTRACT

This invention relates to a temperature control indicator unit comprising a substrate having supported thereon (a) microcapsules enclosing a hydrophobic organic compound possessing an arbitrarily selected melting point, (b) a methine dye and (c) an oxidizing material. More particularly, a unit made by combining an irreversibly color-developing methine dye and an oxidizing material with microcapsules enclosing a hydrophobic organic compound possessing a predetermined melting point and supporting them on a substrate is used for temperature control purposes. A suitable measure is taken, preferably at or below the desired control temperature, to break at least a part of the microcapsules of the unit and thereby produce fissures or the like in the microcapsule membrane. Then, the unit is stored or transported together with an article to be placed under temperature control. As a result, if the article is exposed to temperatures exceeding the desired control temperature, the non-volatile organic compound present in the broken microcapsules melts and diffuses out. This brings the methine dye into contact with the oxidizing material present in proximity thereto and causes an irreversible color development of the methine dye. Thus, the occurrence of abnormal temperature control conditions can be detected by observing such color development.

5 Claims, 4 Drawing Figures

TEMPERATURE CONTROL INDICATOR UNIT

This is a continuation of application Ser. No. 732,823, filed on May 1, 1985, now abandoned.

BACKGROUND OF THE INVENTION

This invention relates to temperature control indicator units. More particularly, it relates to temperature control indicator units which develop a color irreversibly upon exposure to temperatures higher than a predetermined value and, therefore, can be effectively used during the transportation or storage of various articles requiring temperature control (for example, frozen foods, chilled foods, natural flowers, drugs and the like) to judge whether the articles have been maintained within the specified temperature range or not.

Conventionally, there are a wide variety of articles which must be displayed, stored and/or transported under strict temperature control. Especially in recent years, the spread of cold chains has caused large amounts of chilled or frozen foods to appear on the market and their handling requires strict temperature control. More particularly, unless such chilled or frozen foods are maintained at or below their respective specified temperatures during the period of transportation and storage extending from their manufacture to their delivery to consumers, deterioration of the contents, putrefaction due to the propagation of bacteria, and other troubles may take place and raise a serious social problem.

Articles requiring such strict temperature control include not only chilled or frozen foods, but also natural flowers, drugs (for example, certain anticancer agents, vaccines and preserved blood), photographic chemicals, chemical reagents and the like.

Under present conditions, however, it is difficult to know whether or not articles (typically, frozen and chilled foods) requiring strict temperature control are rigidly maintained under proper temperature conditions during the period of time extending from their manufacture to their delivery to consumers. Accordingly, practicable temperature control systems are eagerly desired in related fields of art.

A number of temperature control indicators for use in such applications have already been proposed. For example, U.S. Pat. No. 3,954,011 discloses a temperature control indicator based on the fusion of a colored solid fatty acid and the capillary action of blotting paper. Moreover, Japanese Patent Publication Nos. 4319/'82 and 28559/'82 disclose another temperature control indicator based on the fact that a lipase enzyme is activated in degrees varying with the temperature and its degree of activation can be indicated by different colors with the aid of a pH indicator.

SUMMARY OF THE INVENTION

It is an object of the present invention to provide a temperature control unit which is based on a principle quite different from those of previously disposed systems.

It is another object of the present invention to provide a temperature control unit which develops a color irreversibly at or above an arbitrarily selected temperature and, hence, is useful in the control of storage temperatures.

These and other objects of the present invention are accomplished by a temperature control indicator unit comprising a substrate having supported thereon (a) microcapsules enclosing a hydrophobic organic compound possessing an arbitrarily selected melting point, (b) a methine dye and (c) an oxidizing material.

More particularly, a unit made by combining an irreversibly color-developing methine dye and an oxidizing material with microcapsules enclosing a hydrophobic organic compound possessing a predetermined melting point and supporting them on a substrate is very useful for temperature control purposes. In using this unit to detect the temperature control conditions of an article to be placed under temperature control, a suitable measure is taken, preferably at or below the desired control temperature, to break at least a part of the microcapsules of the unit and thereby produce fissures or the like in the microcapsule membrane. Then, the unit is stored or transported together with the article. As a result, if the article is exposed to temperatures exceeding the desired control temperature, the non-volatile organic compound present in the broken microcapsules melts and diffuses out. This brings the methine dye into contact with the oxidizing material present in proximity thereto and causes an irreversible color development of the methine dye. Thus, the occurrence of abnormal temperature control conditions can be detected by observing such color development.

BRIEF DESCRIPTION OF THE DRAWINGS

In these figures, numeral 1 designates a color-developing layer; numeral 2, a substrate (which can also act as a spacer layer); numeral 3, a microcapsule layer; numeral 4, an adhesive layer; numeral 5, a sheet of release paper; numeral 6, a protective layer; and numeral 7, a spacer layer.

- ● methine dye       △ oxidizing material
- ○ microcapsule
- ⊖ microcapsule enclosing the hydrophobic organic compound having the methine dye dissolved therein

DETAILED DESCRIPTION OF THE INVENTION

The present invention is concerned with a temperature control indicator unit comprising a combination of essential components including:

(a) a methine dye of the general formula $$X-\underset{\underset{Z}{|}}{\overset{\overset{Y}{|}}{C}H}-Z \qquad (I)$$

where X, Y and Z are unsubstituted or substituted phenyl groups, unsubstituted or substituted naphthyl groups, unsubstituted or substituted β-styryl groups, or unsubstituted or substituted aromatic heterocyclic ring radicals, the X, Y and Z radicals may be the same or different, and two of the X, Y and Z radicals may be combined to form a ring;

(b) an oxidizing material; and (c) microcapsules enclosing a hydrophobic organic compound possessing a desired melting point.

In making the unit of the present invention, these essential components (a), (b) and (c) are incorporated into, applied to, or printed on a subtrate such as paper, film and the like.

The unit of the present invention is characterized in that the color development system used for the indication of abnormal temperatures is based on an irreversible color-developing reaction between a methine dye of the general formula (I) and an oxidizing material.

The unit of the present invention is further characterized in that the above-described color development system is combined with microcapsules enclosing a hydrophobic organic compound possessing a desired melting point.

When its melting point is exceeded, the hydrophobic organic compound present in the microcapsules undergoes a solid-to-liquid conversion. More particularly, the compound enclosed in the microcapsules is a solid below its melting point. Even if the microcapsules are broken (for example, by the application of pressure) under such temperature conditions, the contents thereof remain in the solid state and do not diffuse out. However, if the temperature becomes higher than its melting point, the contents melt, flow out of the microcapsules, and dissolve the methine dye present in proximity thereto. This provides the methine dye with a place of contact with the oxidizing material, resulting in an irreversible oxidative color development. Once the methine dye has developed a color under abnormal temperature conditions, the color never disappears even if the temperature becomes normal. Thus, it is possible to detect the occurrence of abnormal temperature during storage or transportation.

The methine dyes which are represented by the general formula (I) and can be used in the practice of the present invention include:

(A-1) triaminotriphenylmethane dyes such as 4,4′,4″-tris(dimethylamino)triphenylmethane, 4,4′,4‴-tris(diethylamino)triphenylmethane, 4,4′-bis(methylamino)-4″-dimethylaminotriphenylmethane, 4,4′-bis(N-methyl-N-benzylamino)-4″-dimethylaminotriphenylmethane, 4,4′-bis(dimethylamino)-4″-(N-methyl-N-benzylamino)triphenylmethane, 4,4′,4″-triamino-3-methyltriphenylmethane, 4,4′-bis(methylamino)-4″-dimethylamino-3,3′-dimethyltriphenylmethane, bis(3-methyl-4-benzylamino)-4′-dimethylaminotriphenylmethane, etc.; (A-2) diaminotriphenylmethane dyes such as 4,4′-bis(dimethylamino)triphenylmethane, 4,4′-bis(dimethylamino)-4″-methyltriphenylmethane, 4,4′-bis(N-benzeyl-N-ethylamino)triphenylmethane, 4,4′-bis(dimethylamino)-4″-methoxytriphenylmethane, 4,4′-bis(dimethylamino)-4″-ethoxytriphenylmethane, 4,4′-bis(dimethylamino)-4‴-ethoxy-3′-methyltriphenylmethane, 4,4′-bis(dimethylamino)-3′,4′-dimethoxytriphenylmethane, 4,4′-bis(N-benzyl-N-methylamino)-4″-methoxytriphenylmethane, etc.;

(A-3) monoaminotriphenylmethane dyes such as 4,4′-dimethoxy-4″-dimethylaminotriphenylmethane, 4,4′-dimethoxy-3″-methyl-4″-methylaminotriphenylmethane, 4-methoxy-4″-diethylaminotriphenylmethane, etc.;

(B) naphthylmethane dyes such as bis(4-dimethylaminonaphthyl-1)-4′-dimethylaminophenylmethane, etc.;

(C) β-styrylmethane dyes such as bis(4-dimethylaminophenyl)-β-styrylmethane, bis(4-dimethylaminophenyl)-β-(4′-dimethylaminostyryl)methane, bis(4-dimethylaminophenyl)-β-(4′-methoxystyryl)methane, bis[3-methyl-4-(N-phenyl-N-methylamino)-phenyl]-β-styrylmethane, bis(3-methyl-4-methylaminophenyl)-β-(4′-methoxystyryl)methane, etc.;

(D) indolylmethane dyes such as bis(1-ethyl-2-methylindol-3-yl)-(4′-ethoxyphenyl)methane, bis(1-ethyl-2-methylindol-3-yl)-(4′-dimethylaminophenyl)-methane, bis(1-butyl-2-methylindol-3-yl)-4′-methoxyphenylmethane, etc.; and (E) other methine dyes such as 3,6-bis(dimethylamino)-9-phenylxanthine, 3,6-bis(dimethylamino)-9-phenylxanthene, 3,6-bis(dimethylamino)-9-(4′-dimethylamino)fluoresceine, etc. It is to be understood that the present invention is not limited to the above-enumerated compounds.

The oxidizing material which is used as one of the components of the temperature control indicator unit of the present invention refers to an organic or inorganic material that, upon contact with a methine dye, can oxidize the methine dye slowly or rapidly to develop a color, and is intended to comprehend all materials having such capability. Among these oxidizing materials, however, (1) organic oxidizing materials and, in particular, benzoquinone derivatives having at least one electron attractive substituent group and (2) inorganic materials having oxidizing power are preferably used in consideration of their safety and ease of application to the present purpose. Useful benzoquinone derivatives having at least one electron attractive substituent group are those having the general formula or where at least one of $R_1$ to $R_8$ is a halogen atom, cyano group, nitro group, carboxyl group, alkoxycarbonyl group, aryloxycarbonyl group, aralkyloxycarbonyl group, alkylsulfonyl group, arylsulfonyl group, aralkylsulfonyl group, alkoxysulfonyl group, aryloxysulfonyl group, aralkyloxysulfonyl group or acyl group, the others are hydrogen atoms, alkyl groups, aryl groups, aralkyl groups, alkoxy groups, aralkyloxy groups, alkylthio groups or arylthio groups, and two adjacent carboxyl groups may form an imido ring.

Specific examples of the benzoquinone derivatives which are represented by the general formula (II) or (III) and can be used in the practice of the present invention include 2,3-dicyano-5,6-dichloro-1,4-benzoquinone, 3,4-dibromo-5,6-dicyano-1,4-benzoquinone, 2,3,5,6-tetrabromo-1,4-benzoquinone, 2,3,5,6-tetraiodo-1,4-benzoquinone, 2,3,5,6-tetraethoxycarbonyl-1,4-benzoquinone, 2,3,5,6-tetraisobutoxycarbonyl-1,4-benzoquinone, 3,4,5,6-tetrapropyloxycarbonyl-1,4-benzoquinone, 2,5-diethoxycarbonyl-1,4-benzoquinone, 2,5-di-n-hexyloxycarbonyl-1,4-benzoquinone, 2,5-dicyclohexyloxycarbonyl-1,4-benzoquinone, 2,5-dibenzoyl-1,4-benzoquinone, 2,5-di-n-butoxycarbonyl-3,6-dichloro-1,4-benzoquinone, 2,5-diethoxycarbonyl-3,6-dibromo-1,4-benzoquinone, 2,5-di-n-octoxycarbonyl-3,6-dibromo-1,4-benzoquinone, 2,5-dibenzyloxycarbonyl-3,6-dichloro-1,4-benzoquinone, 2,5-dibenzoyl-3,6-dichloro-1,4-benzoquinone, 2,5-diacetyl-3,6-dibromo-1,4-benzoquinone, 2,5-diethoxycarbonyl-3,6-diphenylsulfonyl-1,4-benzoquinone, 2,5-diisobutoxycarbonyl-3,6-di(4'-tolylsulfonyl)-1,4-benzoquinone, 2,5-dicyclohexyloxycarbonyl-3,6-di(4'-tolylsulfonyl)-1,4-benzoquinone, 2,5-di-n-octyloxycarbonyl-3,6-di(4'-cyclohexylphenylsulfonyl)-1,4-benzoquinone, 2,5-di-n-hexyloxycarbonyl-3,6-di(3',4'-dimethylphenylsulfonyl)-1,4-benzoquinone, 3,4,5,6-tetraethylsulfonyl-1,4-benzoquinone, 2,3,5,6-tetra-n-octylsulfonyl-1,4-benzoquinone, 2,5-di-n-butoxycarbonyl-3,6-di-n-butoxycarbonyl-1,4-benzoquinone, 2,5-di(4'-toluylsulfonyl)-3,6-dibromo-1,4-benzoquinone, 2-benzoyl-1,4-benzoquinone, 2-phenylsulfonyl-1,4-benzoquinone, 2-(4'-methylphenylsulfonyl)-1,4-benzoquinone, 2-(4'-diphenylylsulfonyl)-1,4-benzoquinone, 2-benzylsulfonyl-1,4-benzoquinone and the like. It is to be understood that the present invention is not limited to the above-enumerated compounds.

Useful inorganic materials having oxidizing power include, but are not limited to, acid clay, activated clay, kaolin, modified titanium oxide and the like.

According to the requirements of particular applications, the above-enumerated oxidizing materials may be used alone or in combination.

The hydrophobic organic compound which is used in the practice of the present invention can be any of the substances that possess a desired melting point and that, when in the liquid state, dissolve the methine dye and either dissolve or become adsorbed to the oxidizing material. These substances may be used alone or in combination.

The hydrophobic organic compound is microencapsulated according to any of various well-known microcapsulation processes including, for example, coacervation process using gelatin as the shell material, interfacial polycondensation process, in situ polymerization process and the like. The resulting microcapsules are required to have a highly dense membrane, resistance to various solvents, thermal resistance and the like. In order to meet these requirements, it is preferable to use microcapsules having a membrane of aminoplast resin (such as urea resin, melamine resin or the like) formed by the in-situ polymerization process or microcapsules having a membrane of polyurea or polyurethane formed by the interfacial polymerization process.

As stated before, the indicator unit of the present invention comprises a substrate having supported thereon the above-described methine dye, oxidizing material, and microcapsules enclosing the hydrophobic organic compound, as well as other additives and/or assistants, if necessary.

The substrate is selected from various materials on which the above-described components can be supported by such means as application, impregnation, incorporation, printing and the like. These materials may be in the form of sheets (for example, paper, film, etc.), bars, granules, masses and the like.

It is also within the scope of the present invention to use microcapsules enclosing the hydrophobic organic compound having the methine dye or the oxidizing material dissolved or dispersed therein.

Now, the present invention is more specifically described in connection with a typical embodiment thereof which relates to temperature control indicator labels for use with articles to be frozen or chilled.

The methine dye and oxidizing material used in this embodiment relating to indicator labels can be any of the above-enumerated compounds.

The hydrophobic organic compound must possess a melting point in the range of $-30°$ to $+30°$ C. It is necessary to select a hydrophobic organic compound which undergoes a conversion from the solid to the liquid phase at a temperature suitable for the intended purpose.

Generally, hydrophobic organic compounds which are harmless and non-volatile and possess a melting point in the range of $-30°$ to $+30°$ C. are not found in large numbers. Among them, esters, alcohols and ketones containing an oxygen atom in the molecule are preferred. In common recording materials such as pressure-sensitive recording paper, heat-sensitive recording paper and the like, reversible color development systems based on the catalytic reaction between a lactone dye and an organic acid material are being used. However, it is often difficult to use such systems in the present invention, because the color development thereof tends to be inhibited by contact with a polar solvent.

Useful hydrophobic organic compounds are those having a boiling point of 200° C. or above, and specific examples thereof include butyl stearate, pentyl stearate, benzyl benzoate, ethyl cinnamate, dipentyl oxalate, dimethyl maleate, diethyl maleate, dibutyl tartrate, tributyl citrate, dibutyl sebacate, dimethyl phthalate, dioctyl phthalate, tricresyl metaphosphate, o-dichlorobenzene, 1,2,4-trichlorobenzene, 1-chloronaphthalene, 1-bromonaphthalene, cyclohexylbenzene, bicyclohexyl, p-bromoanisole, methyl n-nonyl ketone, pentadecane, propyl phenyl ketone, tetradecylacetylene, dimethyl adipate, ethyl myristate, methyl myristate, 1-phenyl-1-butanone, undecanone, ethyl isophthalate, ethyl β-acetylpyruvate, coconut oil, phenylcyclohexane, 1-ethylnaphthalene, dibenzyl ether, methyl benzoate, ethyl cinnamate, diethyl glutarate, 3,3'-dimethylbiphenyl and the like.

In a typical embodiment, the methine dye of the general formula (I) is formed into a suspension by intimately blending, or wet milling, it with a dispersing agent or a solution of a high polymer capable of acting as a protective colloid, in a solvent which does not dissolve the methine dye and preferably in water. Specific examples of the dispersing agent or high polymer capable of acting as a protective colloid, which can be used in the preparation of such a suspension, include anionic surface active agents; nonionic surface active agents; and synthetic, natural and modified natural polymers such as polyvinyl alcohol, carboxymethyl cellulose, methyl cellulose, hydroxyethyl cellulose, styrene-maleic acid copolymers of their salts, diisobutylene-maleic acid copolymers or their salts, alginates, modified starches, casein, gelatin, gum arabic and the like.

Some methine dyes of the general formula (I) are unstable to storage and tend to undergo gradual discoloration as a result of air oxidation. In order to improve the storage stability of such methine dyes, at least one compound selected from water-soluble tertiary alkanolamines, water-soluble sequestering agents and quaternary ammonium salts may be added in an appropriate amount during the dispersion of the methine dye.

Useful alkanolamines having a tertiary amino group include tris-N-(2-hydroxyethyl)amine, tris-N-(2-hydroxypropyl)amine, tris-N-(3-hydroxypropyl)amine, N,N-dipropyl-N-(2-hydroxyethyl)amine and the like.

Useful sequestering agents include ethylenediaminetetraacetic acid, N-hydroxyethylethylenediamine-N,N',N'-triacetic acid, diethylenetriaminepentaacetic acid, N-hydroxyethyliminodiacetic acid, ethylenediamine-N,N'-diacetic acid, 1,3-diaminopropan-2-oltetraacetic acid and nitrilotriacetic acid, alkali metal salts thereof, and the like.

Useful quaternary ammonium salts include lauryltrimethylammonium chloride, stearyltrimethylammonium chloride, distearyldimethylammonium chloride, trimethylbenzylammonium chloride and the like.

Where an alkanolamine, a sequestering agent and/or a quaternary ammonium salt are used, they are added in a total amount of 1 to 10,000 parts by weight, preferably 1 to 1,000 parts by weight, per 100 parts by weight of the methine dye.

The methine dye may also be combined with any of various aqueous or oily vehicles and used in the form of an aqueous or oily ink.

Similarly to the methine dye, the oxidizing material is formed into an aqueous suspension by wet milling or dispersing it in the presence of a surface active agent or a protective colloid material.

The hydrophobic organic compound is microencapsulated by using it alone or together with the methine dye or oxidizing material dissolved or dispersed therein.

In a preferred embodiment of the present invention, an indicator label is made by coating a substrate with the above-described three essential components including (a) an aqueous suspension of the methine dye, (b) an aqueous suspension of the oxidizing material, and (c) microcapsules enclosing the hydrophobic organic compound possessing a melting point in the range of $-30°$ to $+30°$ C. However, it is common practice to use other additives according to the need. For example, in order to control the adhesion properties, surface characteristics, color development characteristics and the like of the coating layer or layers, there may be used various inorganic or organic pigments such as kaolin, talc, titanium carbide, zinc oxide, white carbon, silica, aluminum hydroxide, urea-formaldehyde resin filler, polystyrene dispersion, etc.; and water-soluble binders such as polyvinyl alcohol, methyl cellulose, hydroxyethyl cellulose, soluble starch, casein, vegetable gum, etc. Moreover, in order to prevent the microcapsules from being broken upon exposure to minute pressure, there may also be used stilt materials such as wheat starch, potato starch, cellulose powder, various synthetic resin particles, etc.

One or more aqueous coating fluids prepared as above are then applied to a substrate such as paper.

The coating layer or layers may be formed in a variety of ways. For example, (1) a coating fluid containing the methine dye, the oxidizing material and microcapsules enclosing the hydrophobic organic compound may be applied to a substrate so as to form a single coating layer; (2) the above-described three components may be applied so as to form two adjacent layers; (3) two of the three components may be applied to one side of a substrate, the remaining component being applied to the other side of the substrate; or (4) microcapsules enclosing the hydrophobic organic compound having the methine dye or the oxidizing material dissolved therein and the remaining component may be applied to one side or opposite sides of a substrate.

Moreover, a spacer layer comprising a high polymer may be provided in order to control the sensitivity of the color development. Furthermore, an overcoat layer (or protective layer) comprising a water-soluble high polymer or an aqueous resin emulsion may be provided in order to improve the water or solvent resistance of the indicator label before and during its use. The materials used for the formation of a protective layer may also be incorporated into any of the coating layers. Furthermore, the back side of the indicator label may be coated with an adhesive layer.

It is also within the scope of the present invention to deposit at least one of the essential components on a substrate according to any of various printing techniques, by preparing an aqueous or oily ink containing a resin vehicle and using it in place of a part of the above-described aqueous coating fluids.

Some specific examples of indicator labels are described with reference to the accompanying drawings.

Figure 1:
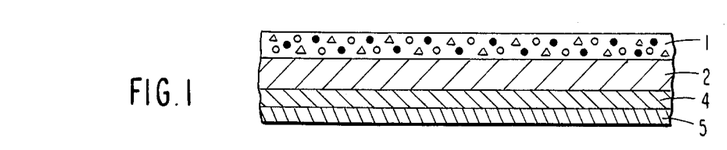
FIGS. 1 to 4 are cross-sectional views of typical indicator labels embodying the present invention.
Figure 2:
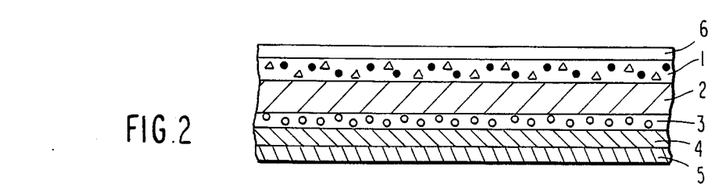
Figure 3:
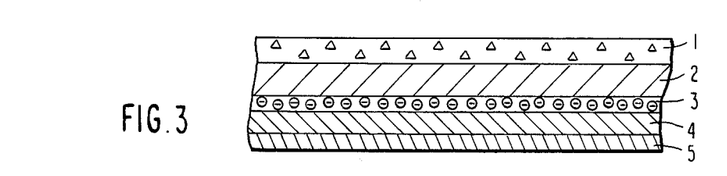
Figure 4:
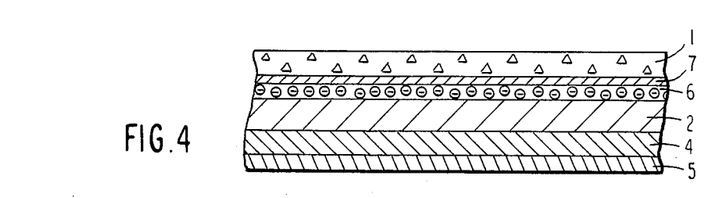

FIG. 1 illustrates an indicator label in which one side of a subtrated is coated with a layer comprising the methine dye, the oxidizing material and the hydrophobic organic compound and the other side is coated with an adhesive layer and a sheet of release paper. FIG. 2 illustrates an indicator label in which one side of the substrate is coated with a layer comprising the methine dye and the oxidizing material and then with a protective overcoat layer and the other side is coated with a layer of microcapsules and then with an adhesive layer and a sheet of release paper. FIG. 3 illustrates an indicator label in which one side of the substrate is coated with a layer comprising the oxidizing material and a polymeric material having water resistance and oil resistance and the other side is coated with a layer of microcapsules enclosing the hydrophobic organic compound having the methine dye dissolved therein and then with a adhesive layer and a sheet of release paper. FIG. 4 illustrates an indicator label in which one side of the substrate is coated with an outer layer comprising the oxidizing material and an inner layer comprising microcapsules enclosing the hydrophobic organic compound having the methine dye dissolved therein, the outer and inner layers being separated by a spacer layer.

Inherently, indicator labels must be sensitive to temperature. However, since the indicator labels of the present invention use microcapsules enclosing a hydrophobic organic compound possessing a predetermined melting point, the color reaction due to contact between the methine dye and the oxidizing material does not take place before their use. Moreover, no particular attention need be paid to the temperature in making these indicator labels. That is, the microcapsules can be applied to or printed on the substrate according to any conventional technique (for example, air-knife coating, blade coating, bar coating, granure coating, flexographic printing, gravure printing or the like) and then dried by the application of heat. Furthermore, these indicator labels can be semipermanently stored at room temperature before use.

The indicator labels of the present invention are used as follows: An indicator label including a layer of microcapsules possessing a melting point suitable for the intended purpose is affixed to an article requiring temperature control or a case or the like containing the article. Prior to use, the microcapsules are partially or totally broken by applying pressure to the label surface with a typewriter, writing means or the like, typically in an environment maintained at or below the predetermined temperature. However, the use of a spacer layer for controlling the diffusion time makes it possible to break the microcapsules at room temperature.

In this state, no visible change appears. However, if the label is exposed to temperature higher than the melting point of the hydrophobic organic compound during storage or transportation, the contents of the microcapsules become molten and the resulting oily matter diffuses through the fissures in the membrane of the broken microcapsules. This oily matter brings the methine dye present in the color-developing layer into contact, at the molecular level, with the oxidizing material present in proximity thereto or through the medium of the substrate. Thus, an irreversible oxidative color development of the methine dye takes place, resulting in a fast color image corresponding to the color of the methine dye.

By selecting the type of hydrophobic organic compound enclosed in the microcapsules according to the desired control temperature, the temperature control indicator units of the present invention can be very effectively used in the temperature control of frozen foods, chilled foods and a wide variety of other temperature-sensitive articles.

Moreover, the type of methine dye used can be selected so that it develops a color (for example, red, orange, blue, green, yellow, pink, black or the like) suitable for the intended purpose.

The units of the present invention are not limited to sheet-like labels, but can take any of various forms (for example, granules or bars coated with the essential components) according to the use conditions of articles to be placed under temperature control.

The present invention is further illustrated by the following examples.

EXAMPLE 1

(A) Preparation of an aqueous dispersion of a benzoquinone derivative

An aqueous dispersion having an average particle diameter of $2\mu$ was prepared by milling the following ingredients in a sand grinding mill.

| | |
|---|---|
| 2,5-Diethoxycarbonyl-3,6-di(p-tolylsulfonyl)-1,4-benzoquinone | 10 g |
| 10% aqueous solution of polyvinyl alcohol | 20 g |
| Water | 20 g |
| Total | 50 g |

(B) Preparation of a methine dye dispersion

An aqueous dispersion having an average particle diameter of $2\mu$ was prepared by milling the following ingredients in a sand grinding mill.

| | |
|---|---|
| 4,4'-Bis(N,N—dimethylamino)-4"-ethoxytriphenylmethane | 10 g |
| 10% aqueous solution of polyvinyl alcohol | 20 g |
| 63% solution of stearyltrimethyl-ammonium chloride (Coatamine D86 Conc.; Kao Soap Co.) | 2 g |
| Water | 18 g |
| Total | 50 g |

(C) Preparation of microcapsules

An ethylene-maleic anhydride copolymer (EMA-31; Monsanto Co.) was dissolved in warm water to form its 10% aqueous solution. Then, 100 g of the 10% aqueous solution of the ethylene-maleic anhydride copolymer was mixed with 200 g of water and adjusted to pH 4.5 with aqueous NaOH. To the resulting solution was added 200 g of ethyl myristate (having a melting point of 10° C.). Using a homomixer, this mixture was emulsified until an average particle diameter of the order of $3\mu$ was attained. To the stirred emulsion was added 60 g of a 50 wt.% aqueous solution of methylated methylolmalemine. This reaction system was heated to 60° C. and condensed at that temperature for 2 hours to complete the microencapsulation.

(D) Fabrication of indicator labels

An aqueous coating fluid (with a solids content of 20%) having the following composition was prepared by using the above-described materials (A), (B) and (C).

| Solid Constituent | Proportion |
|---|---|
| 2,5-Diethoxycarbonyl-3,6-di-(p-tolylsulfonyl)-1,4-benzoquinone | 3.0 |
| 4,4'-bis(N,N—dimethylamino)-4"-ethoxytriphenylmethane | 1.5 |
| Microcapsules enclosing ethyl myristate in a melamine resin membrane | 17 |
| Calcium carbonate | 58.5 |
| Polyvinyl alcohol (Poval #117; Kurare Co.) | 20 |
| Total | 100 |

Using a Mayer bar coater, this aqueous coating fluid was applied to base paper having an areal weight of 70 g/m² so as to give a dry coating weight of 7 g/m², and then dried. Thus, there was obtained a sheet of coated paper.

This sheet was stored at −5° C. for 30 minutes and then stamped at that temperature to break the microcapsules partially. The stamped sheet was divided into six labels of equal size, which were stored at constant temperatures of −5° C., 0° C., +2.5° C., +5° C., +7.5° C. and +10° C., respectively. When the degree of color development was observed, the labels stored at temperatures ranging from −5° C. to +7.5° C. showed no tendency to color development and remained white even after the lapse of 10 hours. On the other hand, the broken microcapsule-bearing area of the label stored at +10° C. developed a green color gradually with the lapse of time and assumed a dark green color after 3 hours.

EXAMPLE 2

Two 20% aqueous coating fluids (a) and (b) having the following respective compositions were prepared by using the dispersions and microcapsules obtained in Example 1.

| Solid Constituent | Proportion |
|---|---|
| (a) | |
| 2,5-Diethoxycarbonyl-3,6-di-(p-tolylsulfonyl)-1,4-benzoquinone | 5 |
| 4,4'-bis(N,N—dimethylamino)-4"-ethoxytriphenylmethane | 1 |
| Kaolin | 74 |
| Polyvinyl alcohol | 20 |
| Total | 100 |
| (b) | |
| Microcapsules enclosing ethyl myristate | 60 |

| Solid Constituent | Proportion |
| --- | --- |
| Wheat starch | 35 |
| Oxidized starch (as a 20% aqueous solution) | 5 |
| Total | 100 |

The aqueous coating fluid (a) was applied to one side of base paper having an areal weight of 50 g/m² so as to give a dry coating weight of 5 g/m², and then dried. On top of that, a protective overcoat layer was formed by applying a 2% aqueous solution of acid-treated gelatin so as to give a dry coating weight of 1.5 g/m². Furthermore, the aqueous coating fluid (b) was applied to the other side of the base paper so as to give a dry coalting weight of 6 g/m², and then dried. Thus, there was obtained a temperature indicator sheet.

This sheet was tested in the same manner as described in Example 1. The labels stored at temperatures up to +7.5° C. showed no tendency to color development even after a long period of time. On the other hand, the broken microcapsule-bearing area of the label stored at +10° C. developed a green color gradually and reached a saturation density in 6 hours.

EXAMPLE 3

Using 2,5-diisobutoxycarbonyl-3,6-dibromo-1,4-benzoquinone as the benzoquinone derivative and 4,4'-bis(N-methyl-N-benzyl)-4"-dimethylaminotriphenylmethane as the methine dye, dispersions were prepared in the same manner as described in Example 1.

(Preparation of microcapsules)

Seventy parts of acrylic acid, 15 parts of styrenesulfonic acid sodium salt (Spinomer SS; Toyo Soda Co.) and 15 parts of hydroxyethyl acrylate were dissolved in water and then polymerized according to the aqueous redox radical polymerization process using a catalyst composed of ammonium persulfate and sodium hydrogen sulfite. Thus, there was obtained a 20% aqueous solution of a copolymer consisting of the above-described three constituents. (Its viscosity was 4,300 cps as measured with a Brookfield viscometer.) To 30 g of this copolymer solution was added 150 g of deionized water. Then, 10 g of urea and 1.4 g of resorcinol were added to the resulting solution and dissolved therein with stirring. Thereafter, this solution was adjusted to pH 3.4 with 10% aqueous NaOH and 100 g of diethyl maleate was added thereto. Using a homomixer, this mixture was emulsified to form an O/W emulsion having an average particle diameter of 3μ. To the resulting emulsion was added 26 parts of 37% formalin. This reaction system was condensed at 55° C. for 3 hours to obtain microcapsules enclosing diethyl maleate.

A 20% aqueous coating fluid having the following composition was prepared by using the above-described dispersions and microcapsules.

| Solid Constituent | Proportion |
| --- | --- |
| 2,5-Diisobutoxycarbonyl-3,6-dibromo-1,4-benzoquinone | 1.5 |
| 4,4'-bis(N—methyl-N—benzylamino)-4"-dimethylaminotriphenylmethane | 0.7 |
| Microcapsules enclosing diethyl maleate | 20 |
| Wheat starch granules | 20 |
| Talc | 37.8 |
| Polyvinyl alcohol | 20 |
| Total | 100 |

Using a Mayer bar coater, this aqueous coating fluid was applied to one side of base paper having an areal weight of 70 g/m² so as to give a dry coating weight of 8 g/m², and then dried. On top of that, a protective overcoat layer was formed by applying an aqueous solution of sodium alginate so as to give a dry coating weight of 1 g/m². Furthermore, a polyacrylate emulsion adhesive was applied to the other side of the base paper, on which release paper was superposed to obtain an indicator sheet.

This indicator sheet was cut into labels measuring 3 cm by 3 cm. These labels were affixed to frozen food packages and stamped at −50° C. to break the microcapsules partially. The labels stored at −10° C. or below showed no tendency to color development. On the other hand, the broken microcapsule-bearing area of the labels stored at temperatures higher than the melting point (−9° C.) of diethyl maleate developed a blue color gradually.

EXAMPLE 4

Using bis(1-ethyl-2-methylindol-3-yl)-4'-ethoxyphenylmethane as the methine dye, an aqueous dispersion was prepared by wet milling the following ingredients in an attritor.

| | |
| --- | --- |
| Methine dye | 10 g |
| Triethanolamine | 1 g |
| Diethylenetriaminepentaacetic acid sodium salt | 0.2 g |
| 10% aqueous solution of polyvinyl alcohol | 20 g |
| Water | 18.8 g |
| Total | 50 g |

Using 2,5-di(p-methylbenzoyl)-1,4-benzoquinone as the benzoquinone derivative, an aqueous dispersion was prepparred in the same manner as described in Example 1.

Moreover, microcapsules were prepared in the same manner as described in Example 1 except that dimethyl adipate (having a melting point of 8° C.) was enclosed therein.

(Fabrication of indicator labels)

An aqueous coating fluid having the following composition was prepared by using the above-described dispersions and microcapsules.

| Solid Constituent | Proportion |
| --- | --- |
| 2,5-Di(p-methylbenzoyl)-1,4-benzoquinone | 5.0 |
| Bis(1-ethyl-2-methylindol-3-yl)-4'-ethoxyphenylmethane | 2.0 |
| Microcapsules enclosing dimethyl adipate | 25 |
| Urea-formaldehyde resin filler (U-Pearl; Mitsui-Toatsu Chemicals Co.) | 15 |
| Wheat starch particles | 10 |
| Polyvinyl alcohol | 15 |
| Calcium carbonate | 28 |
| Total | 100 |

Using a Mayer bar coater, this aqueous coating fluid was applied to one side of base paper having an areal weight of 50 g/m² so as to give a dry coating weight of 6 g/m², and then dried to form a color-developing layer. On top of that, a protective layer was formed by applying a 1 wt.% aqueous solution of gelatin and then drying it. Furthermore, a polyacrylate emulsion adhesive was applied to the other side of the base paper, on which release paper was superposed to obtain indicator labels.

These labels were affixed to containers and stamped during storage at 4° C. to break the microcapsules partially. The label stored at 4° C. showed no tendency to color development even after a long period of time. On the other hand, the stamped area of the label stored at +8° C. developed a reddish-yellow color gradually with the lapse of time and reached a saturation density of distinct reddish-yellow color in 15 hours.

EXAMPLE 6

Using α,α,α',α'-tetrakis(p-dimethylaminophenyl)-p-xylene as the methine dye, an aqueous dispersion was prepared by milling the following ingredients in a sand grinding mill.

| | |
|---|---|
| Methine dye | 10 g |
| 10% methyl cellulose | 20 g |
| Water | 20 g |
| Total | 50 g |

Two 20% aqueous coating fluids (a) and (b) having the following respective compositions were prepared by using the above-described dispersion.

| Solid Constituent | Proportion |
|---|---|
| (a) | |
| Microcapsules enclosing ethyl myristate | 55 |
| Wheat starch | 40 |
| Hydroxyethyl starch (as a 20% aqueous solution | 5 |
| Total | 100 |
| (b) | |
| α,α,α',α'-tetrakis(p-dimethylaminophenyl)-p-xylene | 4 |
| 2,5-diisobutoxycarbonyl-3,6-di(p-tolylsulfonyl)-1,4-benzoquinone | 7 |
| Kaolin | 59 |
| Polyvinyl alcohol | 20 |
| Total | 100 |

The aqueous coating fluid (b) was applied to one side of base paper having an areal weight of 50 g/m² so as to give a dry coating weight of 4 g/m², and then dried. On top of that, the aqueous coating fluid (a) was applied so as to give a dry coating weight of 4 g/m², and then dried. Furthermore, a polyacrylate emulsion adhesive was applyed to the other side of the base paper, on which release paper was superposed to obtain indicator labels.

These labels were tested in the same manner as described in Example 1. When stored at +10° C. or above, they developed a green color gradually.

EXAMPLE 7

4,4',4''-Tris(N-dimethylamino)triphenylmethane (LCV) used as the methine dye was dissolved in methyl myristate in a concentration of 1 wt.%. Using the procedure described in Example 1, this methine dye-containing methyl myristate was microencapsulated in a melamine resin membrane.

An aqueous coating fluid (a) having the following composition was prepared by using the microcapsules thus obtained.

| Solid Constituent | Proportion |
|---|---|
| (a) | |
| Microcapsules enclosing LCV-containing methyl myristate | 60 |
| Wheat starch granules | 35 |
| Urea- and phosphate-treated starch (as a 20% aqueous solution) | 5 |
| Strearyltrimethylammonium chloride | 1 |
| Total | 101 |

Another aqueous coating fluid (b) having the following composition was prepared.

| Solid Constituent | Proportion |
|---|---|
| (b) | |
| 2,5-diethoxycarbonyl-3,6-di(p-tolylsulfonyl)-1,4-benzoquinone | 5 |
| Precipitated calcium carbonate | 50 |
| Solvent-resistant additive (Bonron; Mitsui-Toatsu Chemicals Co.) | 20 |
| Polyvinyl alcohol | 20 |
| Total | 95 |

The aqueous coating fluid (b) was applied to one side of quality paper having an areal weight of 50 g/m² so as to give a dry coating weight of 7 g/m², and then dried. Furthermore, the aqueous coating fluid (a) was applied to the other side thereof so as to give a dry coating weight of 10 g/m², and then dried. Thereafter, release paper having an acrylic resin adhesive layer (40μ in thickness) was laminated to the microcapsule side of the coated paper.

The resulting sheet was tested in the same manner as described in Example 1. The labels stored at temperatures up to +10° C. showed no tendency to color development even after a long period of time. On the other hand, the broken microcapsule-bearing area of the label stored at +12° C. began to develop a blue color gradually after the lapse of 1 hour and reached a saturation density in 10 hours.

EXAMPLE 8

Using the aqueous coating fluids described in Example 7, a temperature control sheet was fabricated in the following manner.

The aqueous coating fluid (a) was applied to a surface of film-based synthetic paper (Yupo #80 having a thickness of 80μ; Oji Petrochemicals Co.) so as to give a dry coating weight of 6 g/m². On top of that, a 10% aqueous solution of partially saponified polyvinyl alcohol (Gosenal T-350; Nippon Gosei Kagaku Co.) was applied so as to give a dry coating weight of 4 g/m². Furthermore, on top of that, the aqueous coating fluid (b) was applied so as to give a dry coating weight of 5 g/m², and then dried to obtain a temperature control sheet. This sheet was laminated to commercially available adhesive-coated release paper (Sony Chemical Co.).

The resulting sheet was tested in the same manner as described in Example 1. The labels stored at temperature up to +10° C. showed no tendency to color development. On the other hand, the broken microcapsule-bearing area of the labels stored at temperatures of 12° C. and above developed a blue color gradually. The label stored at +15° C. reached a saturation density in about 3 hours.

EXAMPLE 9

A temperature history indicator sheet for low-temperature service was fabricated in the same manner as described in Example 2, except that tributyl citrate was enclosed in the mirocapsules.

The resulting sheet was tested in the same manner as described in Example 1. The labels stored at −18° C. or below showed no tendency to color development even after a long period of time. On the other hand, the label stored at −13° C. began to develop a green color gradually after the lapse of 2 hours and reached a saturation density in about 24 hours.

The sheet of this example is useful in the storage temperature history control of frozen foods.

EXAMPLE 10

4,4'-Bis(N,N-dimethylamino)-4''-(N-methyl-N-benzylamino)triphenylmethane was dissolved in methyl nonyl ketone in a concentration of 1 wt.%. Using the procedure described in Example 1, this methine dye-containing methyl nonyl ketone was microencapsulated in a melamine resin membrane.

A 20 wt.% aqueous coating fluid (a) having the following composition was prepared by using the microcapsules thus obtained.

| Solid Constituent | Proportion |
| --- | --- |
| (a) | |
| Microcapsules enclosing methine dye-containing methyl nonyl ketone | 60 |
| Cellulose flocks | 35 |
| Oxidized starch (as a 20% aqueous solution) | 5 |
| Triethanolamine | 5 |
| Total | 105 |

Another 30 wt.% aqueous coating fluid (b) having the following composition was prepared by using an inorganic oxidizing material.

| Constituent | Proportion |
| --- | --- |
| (b) | |
| Activated clay (Silton DR-1; Mizusawa Chemicals Co.) | 100 |
| Oxidized starch (as a 20% aqueous solution) | 15 |
| SBR latex | 5 |
| Total | 120 |

(The resulting dispersion was adjusted to pH 10.5 with aqueous NaOH.)

The aqueous coating fluid (a) was applied to one side of quality paper having an areal weight of 50 g/m² so as to give a dry coating weight of 7 g/m², and then dried. On top of that, a spacer layer was formed by applying a mixture of MSBR-methylacrylate copolymer and partially saponified polyvinyl alcohol so as to give a dry coating weight of 3 g/m². Furthermore, on top of that, the aqueous coating fluid (b) was applied so as to give a dry coating weight of 8 g/m², and then dried. Thereafter, release paper having an adhesive layer was laminated to the other side of the wood free paper to obtain a temperature history control sheet.

This sheet was cut into labels. These labels were stamped with a mark and affixed to chilled foods being stored at +2° C., +4° C., +6° C. The labels on the foods stored at 6° C. or above developed a bluish-purple color gradually in conformity with the stamped mark and reached a saturation density in 48 hours. On the other hand, the labels on the foods stored at +2° C. or +4° C. showed no color development even after the lapse of 48 hours. However, they developed a bluish-purple color upon exposure to room temperature (18° C.).

EXAMPLE 11

An aqueous coating fluid (a) and aqueous gravure inks (b)–(d) having the following respective compositions were prepared.

| | Proportion |
| --- | --- |
| (a) Aqueous coating fluid (with a solids content of 20 wt.) | |
| Solid Constituent | |
| 2,5-Di-n-octoxycarbonyl-3,6-di(p-tolylsulfonyl)-1,4-benzoquinone (wet milled in advance) | 5 |
| Precipitated calcium carbonate | 50 |
| Polyvinyl alcohol | 10 |
| Total | 65 |
| (b)–(d) Aqueous inks | |
| Constituent | |
| Microcapsule powder(*1) | 20 |
| Modified vinyl acetate derivative (Konipol; Nippon Gosei Kagaku Co.) | 50 |
| Dioctyl phosphate monoethanolamine salt | 25 |
| Wheat starch | 20 |
| Methyl alcohol | 150 |
| Total | 265 |

(*1)This microcapsule powder was prepared by dissolving a methine dye in a hydrophobic organic compound, microencapsulating the methine dye-containing hydrophobic organic compound in a melamine resin membrane according to conventional procedure, and then drying the resulting microcapsules with a centrifugal atomizer type spray dryer.
The contents of the microcapsules used in the aqueous inks (b)–(d) were:
(b) methyl myristate having 1 wt. % of 4,4',4''-tris-(dimethylamino)triphenylmethane dissolved therein,
(c) ethyl myristate having 1 wt. % of 4,4'-bis-(dimethylamino)-3''-methyl-4''-ethoxy-triphenyl-methane dissolved therein, and
(d) 1-ethoxynaphthalene having 1 wt. % of bis(1-methyl-2-ethylindol-3-yl)-4'-dimethyl-aminophenylmethane dissolved therein.

Using a bar coater, the aqueous coating fluid (a) was applied to a surface of polypropylene-based synthetic paper (Yupo #60; Oji Petrochemicals Co.) so as to give a dry coating weight of 5 g/m², and then dried. On top of that, an overcoat layer was formed by applying a 10% aqueous solution of modified polyvinyl alcohol (T-350; Nippon Gosei Kagaku Co.) so as to give a dry coating weight of 3 g/m².

Using a form printing machine, patterns were printed by depositing the aqueous inks (b)–(d), in an amount of 5 g/m², on those areas of the coated paper which adjoined each other but did not overlap each other.

Four such temperature control indicator sheets were stamped at −20° C. to break the microcapsules partially, and then stored for 6 hours under temperature conditions of −2° C., +5° C., +10° C. and +13° C., respectively. The sheet stored at −2° C. showed no tendency to color development. For the sheet stored at +5° C., the pattern printed with the aqueous ink (d) developed a red color, but the other patterns showed no color development. For the sheet stored at +10° C., the pattern printed with the aqueous ink (d) developed a red color, the pattern printed with the aqueous ink (c) developed a green color, but the pattern printed with the aqueous ink (b) showed no color development. For the sheet stored at +13° C., the pattern printed with the aqueous ink (d) developed a red color, the pattern printed with the aqueous ink (c) developed a green color, and the pattern printed with the aqueous ink (b) developed a blue color.

The temperature indicator sheet of this example is useful in monitoring the storage temperature range of articles.

What is claimed is:

1. Temperature control indicator unit comprising a substrate having supported thereon (a) microcapsules enclosing a hydrophobic organic compound possessing an arbitrarily selected melting point, (b) a stable, solid methine dye precursor which is substantially colorless and is represented by the general formula:

wherein X, Y and Z each is an unsubstituted or substituted phenyl group, an unsubstituted or substituted naphthyl group, an unsubstituted or substituted β-styryl group, or an unsubstituted or substituted aromatic heterocyclic ring radical, the X, Y and Z radicals can be combined to form a ring, and (c) a stable solid benzoquinone derivative having at least one electron attractive substituent group, whereby, to prepare the temperature control indicator unit for usage, the outer wall of the microcapsules is breached, and whereby the indication of an abnormal temperature exceeding a predetermined temperature is based on an irreversible color-developing reaction between said methine dye precursor and said benzoquinone derivative by contacting said dye precursor and said benzoquinone derivative, said reaction being caused to occur by said hydrophobic organic compound melting and diffusing out of said microcapsules at said abnormal temperature, thereby solubilizing and placing in reactive form said methine dye precursor and said benzoquinone derivative.

2. Temperature control indicator unit comprising a substrate having supported thereon (a) microcapsules enclosing a hydrophobic organic compound possessing an arbitrarily selected melting point and having a stable, solid methine dye precursor or a stable, solid benzoquinone derivative having at least one electron attractive substituent group dissolved or dispersed therein, said methine dye being substantially colorless and represented by the general formula:

wherein X, Y and Z each is an unsubstituted or substituted phenyl group, an unsubstituted or substituted naphthyl group, and unsubstituted or substituted β-styryl group, or an unsubstituted or substituted aromatic heterocyclic ring radical, the X, Y and Z radicals can be the same or different, the two of the X, Y and Z radicals can be combined to form a ring, and (b) the benzoquinone derivative, or the methine dye, respectively, whereby, to prepare the temperature control indicator unit for usage, the outer wall of the microcapsules is breached, and whereby the indication of an abnormal temperature exceeding a predetermined temperature is based on an irreversible color-developing reaction between said methine dye precursor and said benzoquinone derivative by contacting said methine dye precursor and said benzoquinone derivative, said reaction being caused to occur by said hydrophobic organic compound melting and diffusing out of the microcapsules at said abnormal temperature, thereby solubilizing and placing in reactive form said methine dye precursor and said benzoquinone derivative.

3. Temperature history indicator comprising a substrate which supports (a) a stable, solid methine dye precursor which is substantially colorless and is represented by the general formula:

wherein X, Y and Z each is an unsubstituted or substituted phenyl group, an unsubstituted or substituted naphthyl group, an unsubstituted or substituted β-styryl group, or an unsubstituted or substituted aromatic heterocyclic ring radical, the X, Y and Z radicals can be the same or different, the two of the X, Y and Z radicals can be combined to form a ring; (b) a stable, solid benzoquinone derivative having at least one electron attractive substituent group and being capable of oxidizing the precursor and thereby producing a color reaction; the arrangement being such that said precursor and said benzoquinone derivative are not in mutual intimate contact; and (c) microcapsules enclosing a hydrophobic organic compound which has a selected melting point and which, in its molten state, is capable of dissolving said precursor (a) and dissolving or being adsorbed onto said benzoquinone derivative, the arrangement being such that the hydrophobic organic compound is normally retained within the microcapsules, but as they are ruptured and the temperature is above the melting point of the hydrophobic organic compound, the molten compound can diffuse out and contact both said precursor and said benzoquinone derivative, bringing them into mutual intimate contact by dissolving the precursor and dissolving or being adsorbed onto said benzoquinone derivative, thereby placing in reactive form said methine dye precursor, and said benzoquinone derivative, so that said color reaction is caused to occur so as to provide an indication that the temperature has exceeded said selected melting point subsequently to the rupturing of the microcapsules.

4. Process of using a temperature control indicator unit comprising a substrate having supported thereon (a) microcapsules enclosing a hydrophobic organic compound possessing an arbitrarily selected melting point, (b) a stable, solid methine dye precursor which is substantially colorless and is represented by the general formula:

wherein X, Y and Z each is an unsubstituted or substituted phenyl group, an unsubstituted or substituted naphthyl group, an unsubstituted or substituted β-styryl group, or an unsubstituted or substituted aromatic heterocyclic ring radical, the X, Y and Z radicals can be combined to form a ring, and (c) a stable, solid benzoquinone derivative having at least one electron attractive substituent group, to ascertain if a predetermined temperature is exceeded in a particular place:
  (a) causing at least one opening to occur in the outer wall of the microcapsules; and
  (b) locating the temperature control unit in a place where it is desired to know if the temperature thereof exceeds a predetermined temperature during a period of time, whereby the indication of an abnormal temperature exceeding a predetermined temperature is based on an irreversible color-developing reaction between the methine dye precursor and said benzoquinone derivative by contacting said methine dye precursor and said benzoquinone derivative, said reaction being caused to occur by the hydrophobic organic compound melting and diffusing out of the microcapsules at said abnormal temperature, thereby solubilizing and placing in reactive form said methine dye precursor and said benzoquinone derivative.

5. Process of using a temperature control indicator unit comprising a substrate having supported thereon (a) microcapsules enclosing a hydrophobic organic compound possessing an arbitrarily selected melting point and having a stable, solid methine dye precursor, which is substantially colorless and is represented by the general formula:

wherein X, Y and Z each is an unsubstituted or substituted phenyl group, an unsubstituted or substituted naphthyl group, an unsubstituted or substituted $\beta$-styryl group, or an unsubstituted or substituted aromatic heterocyclic ring radical, the X, Y and Z radicals can be the same or different, the two of the X, Y and Z radicals can be combined to form a ring, or a stable, solid benzoquinone derivative having at least one electron attractive substituent group dissolved or dispersed therein and (b) said benzoquinone derivative or said methine dye precursor, respectively, to ascertain if a predetermined temperature is exceeded in a particular plate:
  (a) causing at least one opening to occur in the outer wall of the microcapsules; and
  (b) locating the temperature control unit in a place where it is desired to know if the temperature thereof exceeds a predetermined temperature during a period of time, whereby the indication of an abnormal temperature exceeding a predetermined temperature is based on an irreversible color-developing reaction between the methine dye precursor and said benzoquinone derivative by contacting said methine dye precursor and said benzoquinone derivative, said reaction being caused to occur by said hydrophobic organic compound melting and diffusing out of the microcapsules at said abnormal temperature, thereby solubilizing and placing in reactive form said methine dye precursor and said benzoquinone derivative.

* * * * *